US011250180B2

(12) United States Patent
Anajwala

(10) Patent No.: US 11,250,180 B2
(45) Date of Patent: Feb. 15, 2022

(54) ADAPTIVE TRANSFORMABLE DESIGN GENERATION

(71) Applicant: Autodesk, Inc., San Rafael, CA (US)

(72) Inventor: Sarangkumar Jagdishchandra Anajwala, Singapore (SG)

(73) Assignee: AUTODESK, INC., San Rafael, CA (US)

( * ) Notice: Subject to any disclaimer, the term of this patent is extended or adjusted under 35 U.S.C. 154(b) by 903 days.

(21) Appl. No.: 15/822,543

(22) Filed: Nov. 27, 2017

(65) Prior Publication Data

US 2019/0163867 A1 May 30, 2019

(51) Int. Cl.
| | |
|---|---|
| *G05B 19/4099* | (2006.01) |
| *G06F 30/00* | (2020.01) |
| *B33Y 50/02* | (2015.01) |
| *G06F 30/17* | (2020.01) |
| *G06F 119/18* | (2020.01) |

(52) U.S. Cl.
CPC ......... *G06F 30/17* (2020.01); *G05B 19/4099* (2013.01); *G06F 30/00* (2020.01); *B33Y 50/02* (2014.12); *G05B 2219/49007* (2013.01); *G06F 2119/18* (2020.01)

(58) Field of Classification Search
CPC ...... G06F 30/17; G06F 30/00; G06F 2119/18; G05B 19/4099; G05B 2219/49007; B33Y 50/02
See application file for complete search history.

(56) References Cited

U.S. PATENT DOCUMENTS

| | | | | |
|---|---|---|---|---|
| 7,010,473 | B1 * | 3/2006 | Singh | G06T 17/00 703/7 |
| 7,079,114 | B1 * | 7/2006 | Smith | G06F 3/0346 345/158 |
| 7,086,923 | B2 * | 8/2006 | Karabees | A63H 3/52 446/110 |
| 2008/0189083 | A1 * | 8/2008 | Schell | G06F 30/17 703/1 |

(Continued)

FOREIGN PATENT DOCUMENTS

DE 102004007844 * 9/2005 ............. G06F 17/50

OTHER PUBLICATIONS

"Product Platform and Product Family Design: Methods and Applications" Simpson et al. [Eds], p. 3, 101, 431 and Chap. 8, 10, 17 [retrieved on Jul. 5, 2020]. Retrieved from <https://link.springer.com/978-0-387-29197-0> (Year: 2006).*

(Continued)

*Primary Examiner* — Rehana Perveen
*Assistant Examiner* — Alfred H B Wechselberger
(74) *Attorney, Agent, or Firm* — Gates & Cooper LLP

(57) ABSTRACT

A method and system provide the ability to generate a transformable structure. Design inputs are received. The design inputs include a first design, a second design, and functional inputs (i.e., relating to visual elements) for the two designs. Different facets of the first design are analyzed. The first design is dissected into multiple blocks that can be assembled to create the first design. A new design is converged by analyzing the dissected first design and the functional inputs, wherein the new design represents a design where first design is convertible into the second design.

18 Claims, 9 Drawing Sheets

(56) References Cited

U.S. PATENT DOCUMENTS

2011/0208492 A1\* 8/2011 Xu .................... G06F 30/17
 703/2
2016/0147911 A1\* 5/2016 Bergin ................ G06F 30/00
 703/1

OTHER PUBLICATIONS

Gu, P. "Adaptable Design with Flexible Interface Systems" Transactions of the SDPS, Sep. 2004, vol. 8, No. 3. pp. 61-74 [retrieved on Jul. 5, 2020]. Retrieved from EBSCO host, Science and Technology Collection: AN 17482211. (Year: 2004).\*

Gu et al. "Adaptable Design: concepts, methods, and applicaitons" Proc. IMechE, vol. 223, Part B; doi: 10.1243/09544054JEMI387 [retrieved on Jul. 5, 2020]. Retrieved from <https://journals.sagepub.com/doi/pdf/10.1243/09544054JEM1387> (Year: 2009).\*

Kim et al. "Combining Interactive Exploration and Optimization for Assembly Design" Journal of Mechanical Design [retrieved on Jul. 1, 2020]. Retrieved from <http://citeseerx.ist.psu.edu/viewdoc/download?doi=10.1.1.44.3020&rep=rep1&type=pdf> (Year: 1997).\*

Simpson et al. "Advances in Product Family and Product Platform Design: Methods and Applications" [Editors] Parts II and III, Springer: DOI 10.1007/978-1-4614-7937-6 [retrieved on Jan. 8, 2021] (Year: 2014).\*

Kuhr et al. "Concept Opportunity Diagrams, A Visual Modeling Method to Find Multifunctional Design Concepts" DETC2010-29068, Proceedings of IDETC/CIE 2009, Montreal, Quebec, Canada [retrieved on Jan. 7, 2020] (Year: 2010).\*

Jiao et al. "Fundamentals of product family architecture" Integrated Manufacturing Systems, vol. 11, Issue 7; DOI: 10.1108/09576060010349776 [retrieved on Jan. 7, 2020] (Year: 2000).\*

"Product Platform and Product Family Design: Methods and Applications" Simpson et al. [Eds], Chaps. 1, 7-8, 18; ISBN-13: 9780387257211 [retrieved on Jul. 5, 2020]. Retrieved from <https://link.springer.com/978-0-387-29197-0> (Year: 2006).\*

Astonkar et al. "Design and Development of multipurpose, space saving seating arrangement using Ergonomics" Int. Journal of Engineering Research and Application, ISSN: 2248-9622 [retrieved on Sep. 23, 2021] (Year: 2015).\*

Varghese et al. "Design of Multipurpose Modular, Flexible and Space-saving Dining Table" SASTECH, vol. 10, Iss. 2 [retrieved on Sep. 23, 2021] (Year: 2011).\*

Vucinic et al. "Development of a Scientific Visualization System" [thesis] Faculty of Engineering, Department of Mechanical Engineering, Fluid Mechanics and Thermodynamics Research Group, Vrije Universiteit Brussel [retrieved on Sep. 22, 2021] (Year: 2007).\*

Weichel et al. "ReForm: Integrating Physical and Digital Design through Bidirectional Fabrication" UIST, Charlotte, NC; https://doi.org/10.1145/2807442.2807451 [retrieved on Sep. 22, 2021] (Year: 2015).\*

Koren et al. "Product Design for Mass-Individualization" CIRP 25th Design Conference Innovative Product Creation, vol. 36, pp. 64-71 [retrieved on Jan. 8, 2021] (Year: 2015).\*

\* cited by examiner

ADAPTIVE TRANSFORMABLE DESIGN GENERATION

BACKGROUND OF THE INVENTION

1. Field of the Invention

The present invention relates generally to computer design and manufacturing applications, and in particular, to a method, apparatus, system, and article of manufacture for generating an adaptive transformable design.

2. Description of the Related Art

Prior art computer design systems are more or less restricted to designing elements as individual pieces, targeted as a whole or as components of one target structure. In other words, designers often create and generate a design for a single product. For example, in the manufacturing space and/or architecture, engineering, and construction (AEC) space, a computer designer may create a single table, a chair, a bed, etc. However, it would be useful to create a multi-functional design that could be utilized for multiple different products (e.g., a design that serves as both a table and chairs as well as a bed, or a chair that can convert/transform into a ladder). Prior art systems fail to provide any mechanism or capability to assist a designer in generating transformable designs.

SUMMARY OF THE INVENTION

Embodiments of the invention provide the ability to analyze multiple targeted design artifacts/blocks and recommend a design that allows the creation of a single structure to serve multiple purposes as well as a structure that can be dissected and assembled in different ways to make different structures. Further, embodiments of the invention provide a method for additive printing of such designs.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method to design and make elements that enable construction of transformable/convertible target structures. In particular, embodiments of the invention provide the ability to analyze multiple target design artifacts and recommend/provide a design that allows users to create a single structure that serves multiple purposes as well as a structure that can be dissected and assembled in different ways to make different structures. Further, embodiments of the invention provide a method for additive printing (e.g., on a 3D printer) of such designs.

Figure 1:
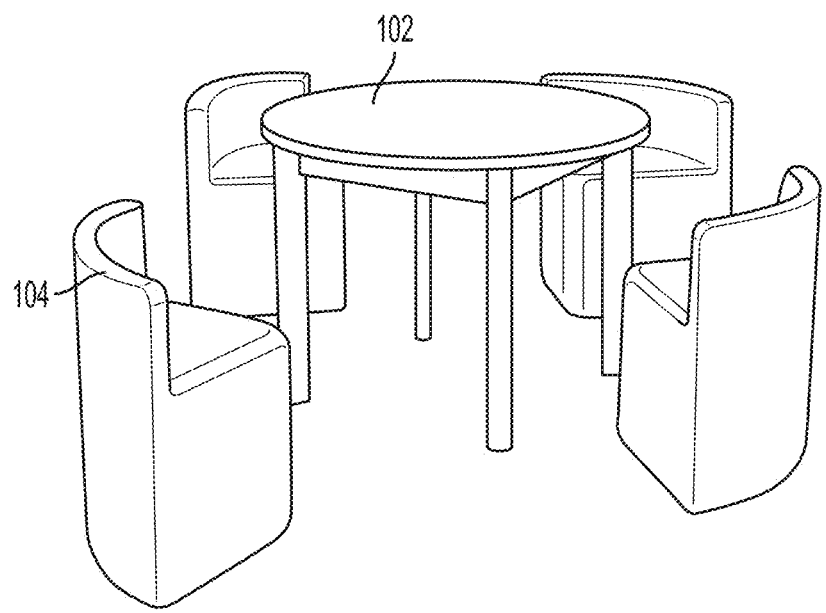
FIG. 1 illustrates an exemplary convertible table-chair in accordance with one or more embodiments of the invention.
Figure 1:
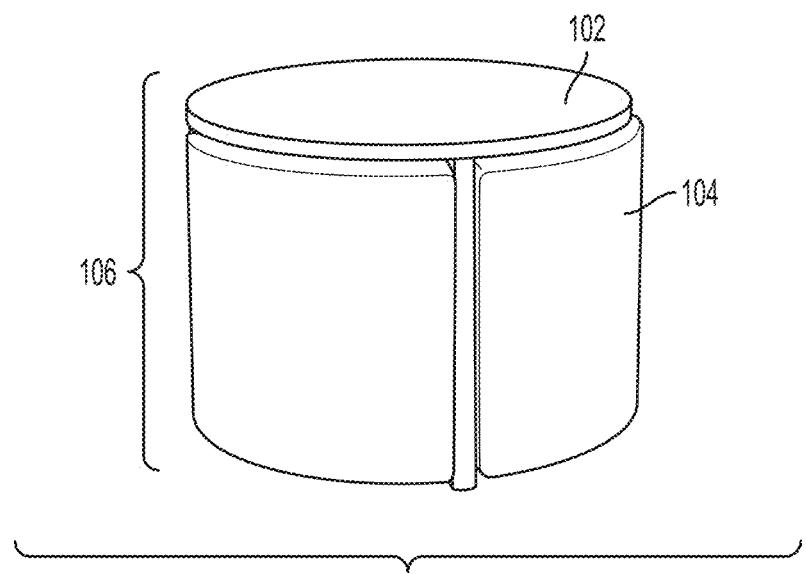

FIG. 1 illustrates an exemplary convertible table-chair in accordance with one or more embodiments of the invention. As illustrated, the design includes a first product use as a table 102 and chairs 104, and a second product use as a coffee table 106 wherein all of the elements/components 102-104 are used in both designs.

Figure 2:
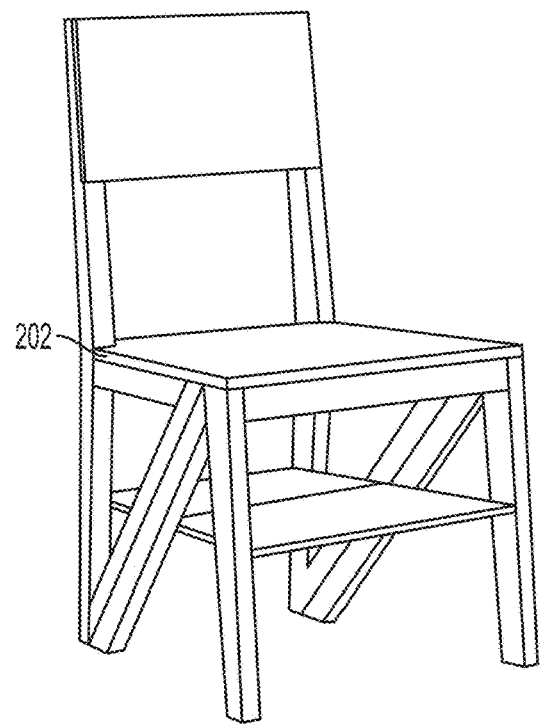
FIG. 2 illustrates an exemplary convertible chair-ladder in accordance with one or more embodiments of the invention.
Figure 2:
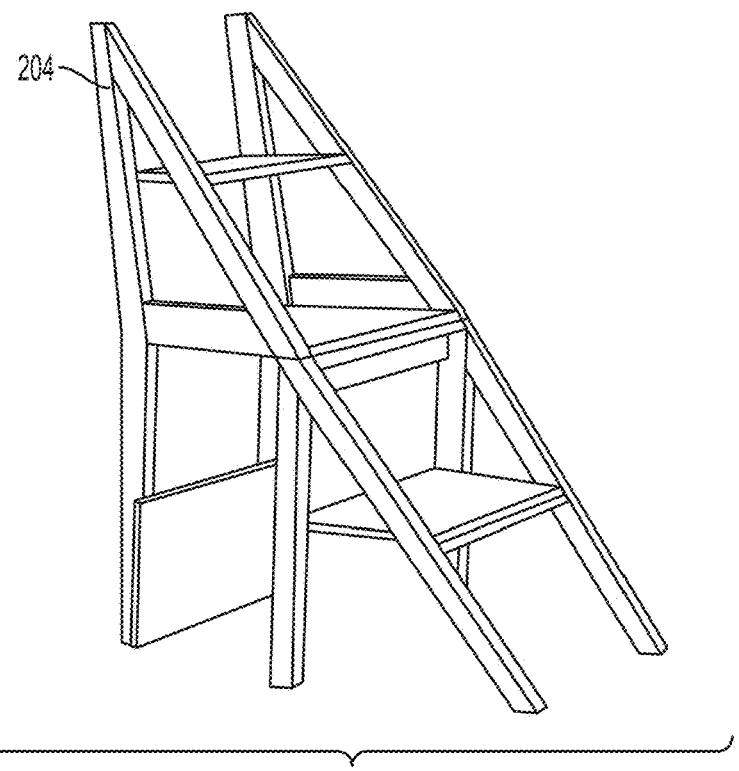

FIG. 2 illustrates an exemplary convertible chair-ladder in accordance with one or more embodiments of the invention. As illustrated, the design enables the transformation/conversion between chair 202 and ladder 204.

Adaptive Transformation Design Methodology Overview

Figure 3:
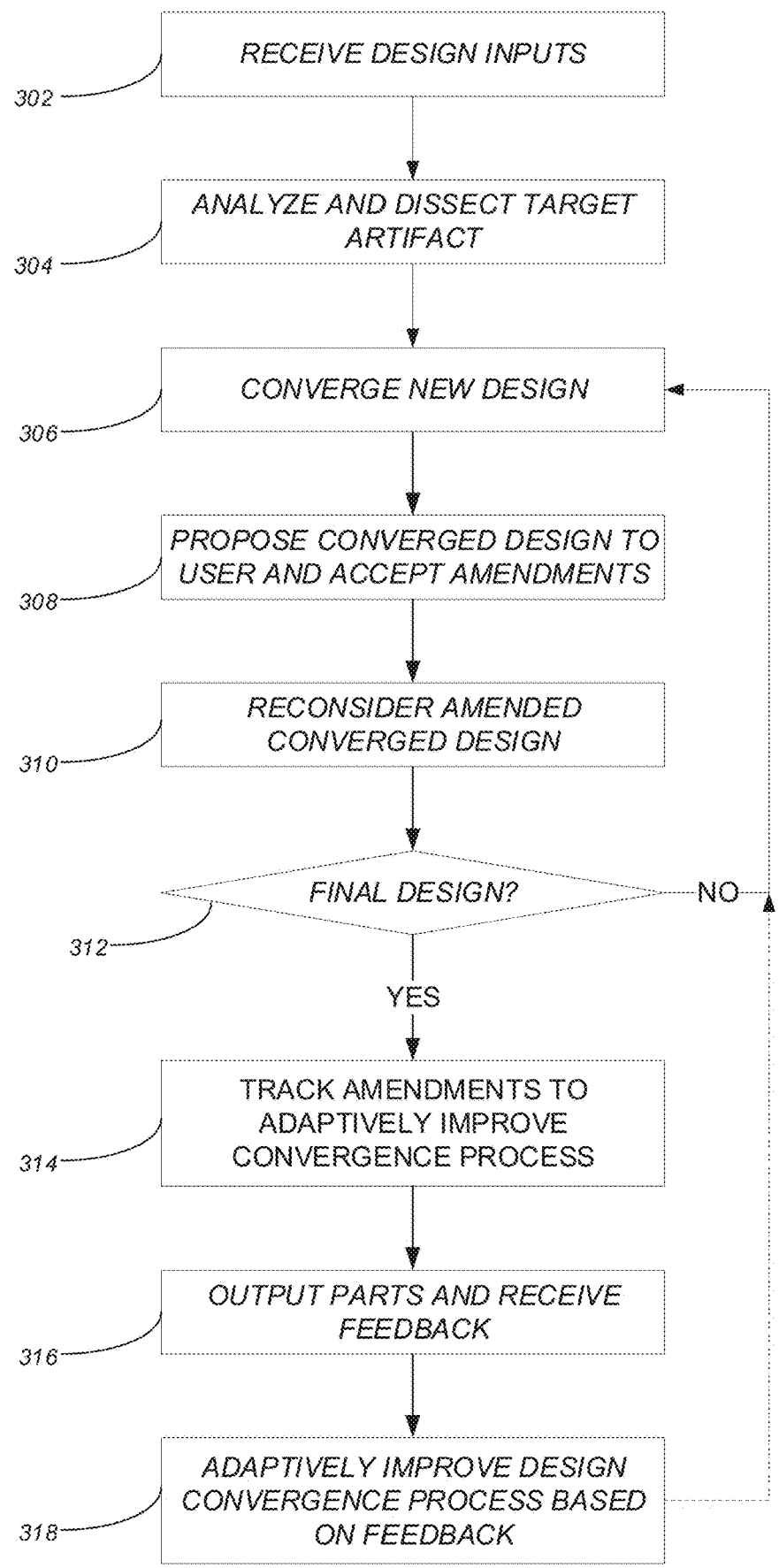
FIG. 3 illustrates the logical flow that provides the ability to converge different designs into a smarter design/target structure in accordance with one or more embodiments of the invention.

Embodiments of the invention provide the ability to design and make element for a transformable/convertible target structure. FIG. 3 illustrates the logical flow that provides the ability to converge different designs into a smarter design/target structure in accordance with one or more embodiments of the invention. In one or more embodiments, such steps may be performed by a (smart) design assistant.

At step 302, design inputs (e.g., a first design and a second design) are received/taken by/from a user (of a design tool). Such a user may create multiple design artifacts specifying functional as well as non-functional inputs in the design of each artifact. For example, as functional inputs, the user may specify the size of various parts or as non-functional inputs, the user may specify pressure points/load capacity of specific surfaces, etc. As used herein, functional inputs relate to visual elements of a design (e.g., surface area, angles, etc.), while non-functional elements relate to non-visual elements of a design (e.g., load capacity of a surface/angle, strength of a surface/angle, etc.).

At step 304, the target artifacts/facets (e.g., of the first design) are analyzed/dissected. In this regard, different facets of the target artifact may be analyzed and dissected into multiple parts that can be connected/assembled (with other parts) to create the target/first design. In one or more embodiments, the second design may also be dissected into multiple blocks that can be assembled to create the second design.

At step 306, a new design is converged. The new design serves the purpose of more than one design artifact by analyzing dissected parts and their metadata (e.g., from step 304). Accordingly, the new design is converged by analyzing the dissected first design and the functional inputs (and possibly its comparison with the dissected second design and functional inputs), wherein the new design represents a design where the first design is convertible into the second design (and vice versa).

At step 308, the converged design is proposed to the user who may be allowed/permitted to make amendments/changes to the converged design.

At step 310, the amended/new converged design is reconsidered based on the new input from the user in step 308.

At step 312, a determination is made regarding whether a final design has been achieved. If a final design has not been achieved, the process repeats steps 306-312 until the final design has been reached (e.g., until the user approves the final design).

At step 314, the amendments to the design are tracked to adaptively improve the convergence process of step 306. In other words, any changes (made by the user and the system to produce a new converged final design) are tracked in order to provide learned behavior that can improve future designs.

At step 316, the parts are output and feedback is collected (about the output). For example, the parts may be output to a three-dimensional (3D) printer for additive printing and feedback may be collected about printing each part from the printer and from the user.

At step 318, the design convergence process (e.g., of step 306) is adaptively improved based on the feedback (e.g., as illustrated by the dashed line).

Adaptive Transformation Design Methodology Details

As described above, FIG. 3 illustrates an overview of the method for generating an adaptive transform design. The method below provides an overview of the various components and functions that may be used to perform the steps of FIG. 3.

Function Overview

1. Step 302—Receive design inputs $d_i$ and $d_j$—two designs. In addition to standard 3D design model specific geometrical information, the input designs may also contain metadata information (e.g., load-capacity for different elements of a design [e.g., surface, points etc.]).

2. Step 304—Function identifyBlocks(d) returns different possible sets of blocks that can be assembled to create whole design 'd'.

3. Step 304—Function matchBlocks (blockSet$_i$(m), d$_j$) matches each set of blocks identified in step 2 above with design d$_j$ and returns match-coefficient for this set of blocks. The match-coefficient indicates how well given set of blocks match between two designs.

4. Step 306—Function findCommonBlocks$_{ij}$ (blockSet$_i$, blockSet$_j$, matchCoeff$_{ij}$) uses these match-coefficients for each set of blocks for designs d$_i$ & d$_j$, checks feasibility of convergence based by comparing the match-coefficients against a threshold value and returns convergedDesignElements for designs d$_i$ & d$_j$.

5. Step 306—convergedDesignElements here represents three (3) sets of blocks—common blocks, unique blocks for design d$_i$ and unique blocks for design d$_j$.

6. Step 308—These converged elements are presented to the user by highlighting them in both the designs so that the user can view common blocks as well as unique blocks of each design and, if possible, the user can modify the design such that unique blocks are reduced; resulting in a design that provides more efficient convergence.

7. Step 310-312—If the user updated the design, steps 2 to 6 are applied again proposing another iteration of the converged design to the user.

8. Step 312-318—The user has the option to accept proposed design or request another proposal. If the user requests another proposal, another attempt will be executed to propose another converged design (e.g., back to step 306).

Function Details

A pseudo method of the above steps is described below. However, it should be understood that this is a representative method and it can evolve through an iterative process, within the scope and spirit of the invention, to cover more complex designs. This implementation should not be considered restrictive for embodiments of the invention.

---

Pseudocode for Function "common$_p$ = fCommon(d$_i$, d$_j$, p)"

---

```
commonp = fCommon(d_i, d_j, p) {
    d_i = identifyComplexDesign(d_i, d_j)
    List<blockSet_i>= identifyBlocks(d_i)
    For (blockSet_i(m) in List<blockSet_i>) {
        struct {blockSet_j(m), matchCoeff_ij(m)} = matchBlocks (blockSet_i(m), d_j)
    }
    struct {commonBlocks_ij , uniqueBlocks_i , uniqueBlocks_j } = findCommonBlocks_ij (blockSet_i , blockSet_j, matchCoeff_ij)
    return struct {commonBlocks_ij , uniqueBlocks_i , uniqueBlocks_j }
} End of "fCommon(d_i, d_j, p)"
```

---

The identifyComplexDesign function provides that for given designs d$_i$ and d$_j$, the objective is to find out the most complex design having the smallest continuous surfaces/blocks/components. Let's assume d$_i$ is that design in the present case. Thus, as used herein, the most complex design is the design having the smallest/smaller components between designs. The design with the smallest components is determined to be the most complex because two smaller components can potentially be combined to form a bigger component. The process begins by identifying the more complex design because it facilitates the ability to merge smaller components into a larger component.

The identifyBlocks function identifies all possible combinations of blocks within the design that add up to make design d$_i$. Here, blockSet$_i$ represents one set of blocks—Set<block$_i$>—that add up to make the whole design. The List<blockSet$_i$> represents list of all possible combinations that can add up to make the whole design. Each block$_i$ object contains the shape of the block, size of the block, information about adjacent blocks, and the connection metadata like edge of connection, angle of connection etc. in addition to metadata about the block (e.g., load-capacity of the block, pressure points of the block, direction of pressure, etc.)

The for loop compares blocks in each set of block (blockSet$_i$) with the other design d$_j$ and finds/determines possible matches. The match coefficient provides a measure (e.g., a score) to evaluate a potential match. Accordingly, the output from the matchBlocks function (within the for loop) is a structure (e.g., an array) with a set of blocks/components and match coefficients for each matching set.

The result from the for loop is used by the next function findCommonBlocks. The findCommonBlocks function takes as input—the different block sets for the different designs i and j, and the match coefficients. The output from the findCommonBlocks function is a structure of the blocks in common between the two block sets (i.e., the matching blocks based on an evaluation of the match coefficients— e.g., the best match) as well as the remaining unique blocks. Thus, the findCommonBlocks function provides the common blocks of both designs in commonBlocks$_{ij}$ and designs specific unique blocks as uniqueBlocks$_i$ & uniqueBlocks$_j$.

The commonBlocks and unique blocks are then output by the fCommon function.

---

Pseudocode for Function "identifyComplexDesign(d$_i$, d$_j$)"

```
identifyComplexDesign(d_i, d_j) {
MetaComplexity_i = findMetaDataComplexity(d_i)
MetaComplexity_j = findMetaDataComplexity(d_j)
Where,
MetaComplexity = struct {
        type of metadata (pressure point, load-capacity, elasticity etc.),
            //value is assigned to each type
        value of each complexity,
        count of design elements having metadata complexity
    }
angleCounts_i = count total number of angles in design d_i
angleCounts_j = count total number of angles in design d_j
angleCountDiff_ij = angleCounts_i - angleCounts_j
If (weightedAvg (MetaComplexity_i) > weightedAvg (MetaComplexity_j)
&& angleCountDiff_ij > THRESHOLD ) {
        metaComplexity = MetaComplexity_i
} else {
        metaComplexity = MetaComplexity_j
}
} //End of "identifyComplexDesign(d_i, d_j)"
```

---

The identifyComplexDesign function is used by the fCommon function described above. The function identifies the complexity of metadata. The original design tool is expected to add metadata with different elements of the design. Metadata represents the highest level of complexity as it puts strict restrictions on the flexibility to make any amendments in the design (for convergence). Accordingly, the findMetaDataComplexity functions output the levels of complexity for each design d$_i$ and d$_j$.

The MetaComplexity that is output consists of an array structure that includes the type of metadata (e.g., pressure point, load-capacity, elasticity, etc.) a value for each type, and a count of the number of design elements of a certain type having that value. Thus, the structure consists of a type-value pairs and counts for design elements of each pair.

The angleCounts variables store the number of angles in each design. Such an angle count may reflect how many smaller points exist in a design.

The IF statement determines, which design is the more complex design between d$_i$ and d$_j$. The average metacomplexities are compared and for the design with the highest metacomplexity, whichever design has the higher angle count (that is beyond a threshold difference) is determined to be the more complex design. The threshold value is used to determine whether the difference in the angle count is significant enough to be considered more complex (e.g., if one design has 101 angels and the other design has 100 angles, such an angle difference of 1 may not be considered enough of a complexity difference). Nonetheless, depending on the configuration desired by the user, the threshold value may simply be zero (0). Alternatively, the consideration of angles may not be used at all.

In other words, the function retains the elements of the design as much as possible and determines if there are many smaller surfaces/elements that can be brought together to converge into a less complex design. As an example, suppose d$_i$ has 3 blocks of 5 cm each and d$_j$ has 1 block of 15 cm. If one takes the higher complexity design, all three blocks from d$_i$ can be merged into d$_j$. However, the opposite cannot occur without requiring the dissection of d$_j$ into multiple blocks.

As described above, the identifyBlocks function is used to identify all possible combinations of blocks within a design that add up to make a whole/complete design. More specifically, the identifyBlocks (d$_i$) function primarily relies on the segmentation done at the time of design creation. While creating the original design, each block/surface is created separately and the design is created gradually by extending the design done so far. For example, when building a design, a designer draws different blocks, and as each block is complete, the block is marked at a separate block of the overall design. In this regard, the block information is recorded during the creation of the source design and used in the identifyBlocks method to identify independent basic blocks that constitute the design. However, available basic blocks may also be dissected at each angle to segregate independent surface-blocks. For example, the original design may contain an "L" block which was added as a single block. But this method dissects the "L" block into two rectangle surface-blocks at the angle of 'L' and represents the dissected set as separate sets of blocks. Thus this method returns different possible sets of blocks that can constitute the whole design.

---

Pseudocode for Function "matchBlocks (blockSet$_i$(m), d$_j$)"

```
matchBlocks (blockSet_i(m), d_j) { //returns matchCoeff
for (block_i(x) in blockSet_i(m)) { //here, blockSet_i(m) is a set of blocks
        matchMap.put(block_i(x), List<block_j>)
}
for (block_j(n1) in matchMap.values.get(idx)) {
        idx = idx + 1
        for (block_j(n2) in matchMap.values.get(idx)) {
            idx = idx+1
            for (block_j(n3) in matchMap.values.get(idx)) {
                ........
                total Volume = Σ volume(block_j(nx))
                total SurfaceArea = Σ surfaceArea(block_j(nx))
                totalLength = Σ length(block_j(nx))
                total Width = Σ width(block_j(nx))
                ....... (More parameters may be derived through
iterations of development to find out a best fit.)
                If (total Volume = thresholdVolume(d_j) AND
totalSurfaceArea = thresholdSurfaceArea(d_j) AND totalLength=
thresholdLength(d_j) AND totalWidth = thresholdWidth(d_j) AND ....)
                    matchCoeff =
                    getMatchCoeff(List<block_j(nx)>)
                else
                    process next set of values //continue the loop
}
    return matchCoeff
} //End of "matchBlocks"
```

---

The matchBlocks method is used as part of the analysis step 304 of FIG. 3. the matchBlocks method matches each set of blocks with a design and returns a match coefficient for the set of blocks. In other words, the matchBlocks method examines/compares multiple blocks of two designs to find matches. The method considers physical aspects of the blocks as well as metadata as part of the comparison and returns a match coefficient for each set.

Looking at the pseudocode above, the first for loop is utilized to find a list of blocks in the design d$_j$ that match with block$_i$(x) in terms of metadata match, volume threshold match (threshold match, e.g. 90% area match), surface area threshold match, etc.

From the values (lists) stored in the matchMap, the method then finds out all mutually exclusive values that help form design d$_j$. The inner for loop (i.e., for (block$_j$(n3) in matchMap.values.get(idx))) examines different aspects/ properties of each block (e.g., volume of blocks of a particular design, total surface area, total length, total width, etc. [more parameters can be derived through iterations of development]). Further, the different aspects/properties of each block may be utilized to determine matches for various different designs/fields of use.

The different aspects/properties are then compared to threshold levels to determine if there is a common/mutual design. The threshold value may be a variable that can be defined at implementation based on an analysis of the current designs/goals. For example, if the total volume of the blocks in one design is within a threshold volume of another design, a match may be determined (assuming the other aspects/attributes are also true).

The match coefficient is then computed based on the differences in values within the threshold values. In this regard, the match coefficient may depend on the aspects/ properties that are being compared and may vary based thereon. For example, if the volume is considered more important than surface area, different threshold values may be used for the different aspects/properties.

---

Pseudocode for Function "findCommonBlocks$_{ij}$ (blockSet$_i$ , blockSet$_j$, matchCoeff$_{ij}$)"

---

```
findCommonBlocks_ij (blockSet_i , blockSet_j , matchCoeff_ij) { returns
convergedDesignElements_ij
for (blockSet_i (m) in blockSet_i) {
    if (matchCoeff_ij (m) > THRESHOLD_MATCH_COEFF)
        commonBlocks_ij.add(blockSet_i (m))
        blockSet_j.evict(m)
    else
        uniqueBlocks_i .add(blockSet_i (m))
uniqueBlocks_j = blockSet_j //remaining blocks in blockSet_j are all unique
blocks for design d_j
convergedDesignElements_ij = struct {commonBlocks_ij , uniqueBlocks_i ,
uniqueBlocks_j }
return convergedDesignElements_ij
} //end of "findCommonBlocks_ij"
```

The findCommonBlocksij method uses the match coefficients for each set of blocks, checks a feasibility of convergence, and returns an array of the common blocks as well as the blocks that are unique to each design. In this regard, for each set of blocks, the pseudocode compares the match coefficient for that set to a threshold and if the match coefficient is greater than the threshold, the blocks are considered a match and are added to the set of common blocks. If the threshold is not exceeded, then the blocks are considered unique and the remaining blocks are added to a set of unique blocks for each design.

Exemplary Use Cases

Table-Sitting Area and Bed

Figure 4A:
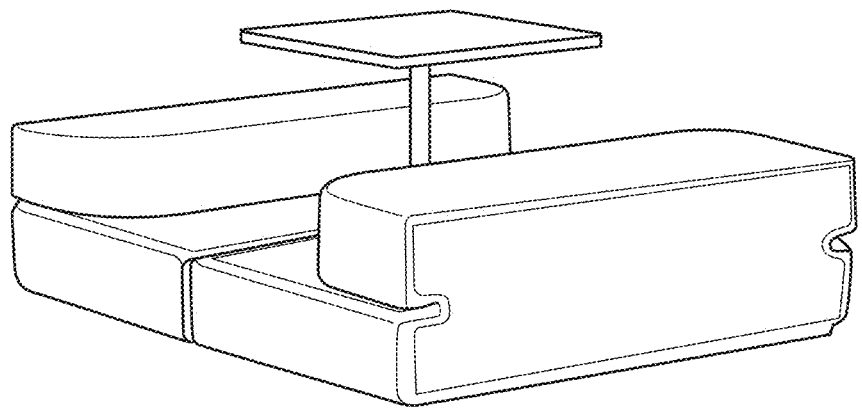
FIGS. 4A and 4B illustrate an exemplary use case of a table-sitting area that may be converted into a bed in accordance with one or more embodiments of the invention.
Figure 4B:
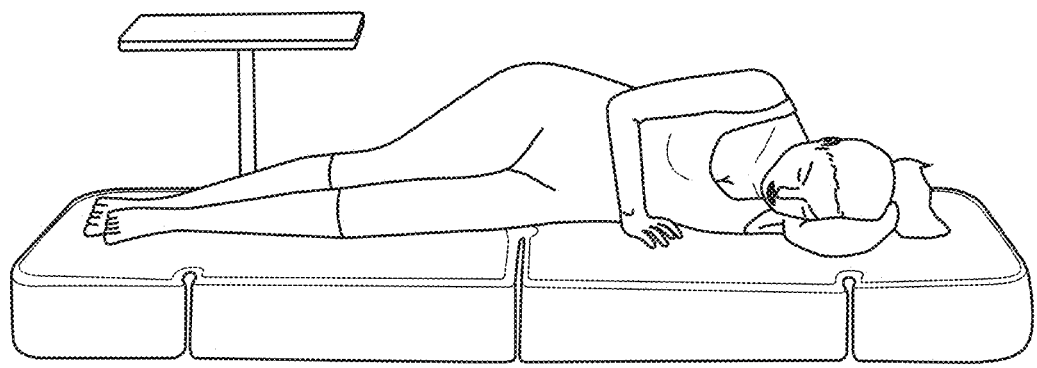
Figure 5A:
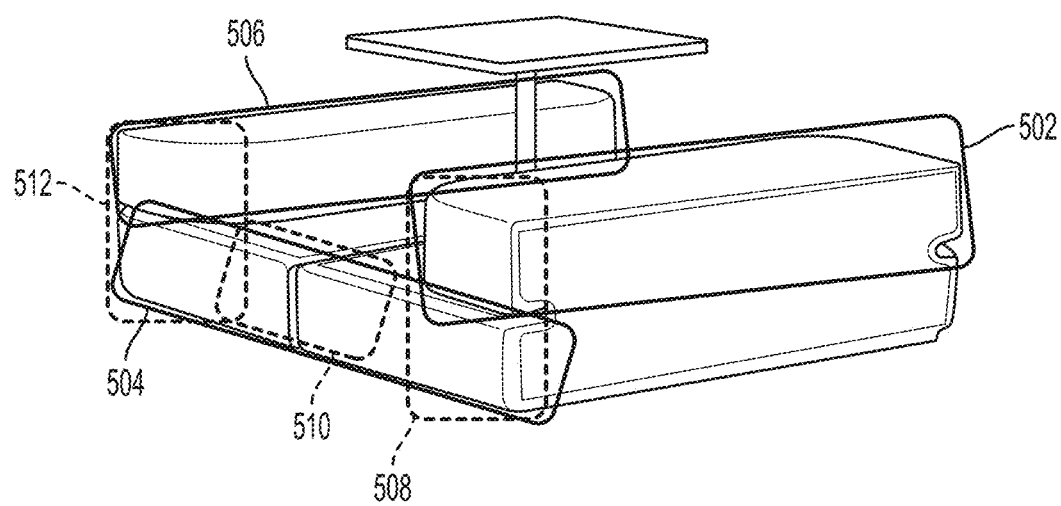
FIGS. 5A and 5B illustrate a sitting place and bed respectively with parts identified from the fCommon method in accordance with one or more embodiments of the invention.
Figure 5B:
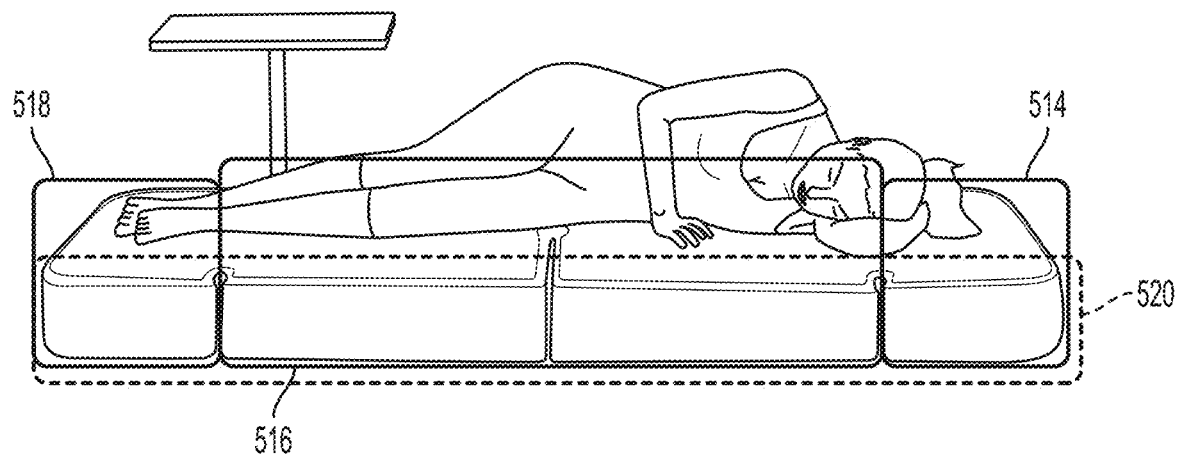

FIGS. 4A and 4B illustrate an exemplary use case of a table-sitting area that may be converted into a bed in accordance with one or more embodiments of the invention. One may assume that the two designs shown in FIGS. 4A and 4B are completely different images. The fCommon method may be used to dissect the whole design into multiple parts. FIGS. 5A and 5B illustrate a sitting place and bed respectively with parts identified from the fCommon method in accordance with one or more embodiments of the invention.

In FIG. 5A, the parts identified from the fCommon method follow:

Part 502: Rectangle Box: 20(l)×7(w)×5(h) unit size, 200 kg load capacity;

Part 504: Rectangle Box: 20(l)×25(w)×5(h) unit size, 200 kg load capacity;

Part 506: Rectangle Box: 20(l)×7(w)×5(h) unit size, 200 kg load capacity;

Part 508: Rectangle Box: 20(l)×7(w)×10(h) unit size, 200 kg load capacity;

Part 510: Rectangle Box: 20(l)×15(w)×5(h) unit size, 200 kg load capacity; and Part 512: Rectangle Box: 20(l)×7(w)×10(h) unit size, 200 kg load capacity.

In FIG. 5B, the parts identified from the fCommon method follow:

Part 514: Rectangle Box: 20(l)×7(w)×5(h) unit size, 200 kg load capacity;

Part 516: Rectangle Box: 20(l)×25(w)×5(h) unit size, 200 kg load capacity;

Part 518: Rectangle Box: 20(l)×7(w)×5(h) unit size, 200 kg load capacity; and Part 520: Rectangle Box: 20(l)×39(w)×5(h) unit size, 200 kg load capacity Thus, the fCommon($d_i$, $d_j$, p) method dissects designs based on various parameters (e.g., surfaces, edges, angles, metadata, etc.) and finds out common parts of both designs. In this case, three (3) parts are found to be common that can be converged to form a single design. Specifically, parts 502, 504, and 506 from FIG. 5A and parts 514, 516, and 518 from FIG. 5B are common. Similarly, parts 508, 510, and 512 from FIG. 5A and part 520 from FIG. 5B are ignored because they do not present an opportunity for convergence.

Based on the above, the result of "fCommon($d_i$, $d_j$, p)" method is:

Part 502/514: Rectangle Box: 20(l)×7(w)×5(h) unit size, 200 kg load capacity;

Part 504/516: Rectangle Box: 20(l)×25(w)×5(h) unit size, 200 kg load capacity; and Part 508/518: Rectangle Box: 20(l)×7(w)×5(h) unit size, 200 kg load capacity.

Now, this is a very simple example where three (3) parts match perfectly in both designs. However, the same method can be implemented for complex designs where parts may not match exactly but based on similarity, seemingly common parts may be highlighted and a convergence of designs may be proposed. Embodiments of the invention can show these proposals to a designer and the designer can choose to accept one or more proposals with required amendments. Few more examples are discussed below to highlight various facets of the disclosure. As mentioned earlier, these are only illustrations and the disclosure is not limited to these examples.

Fitment of Designs

Figure 6B:
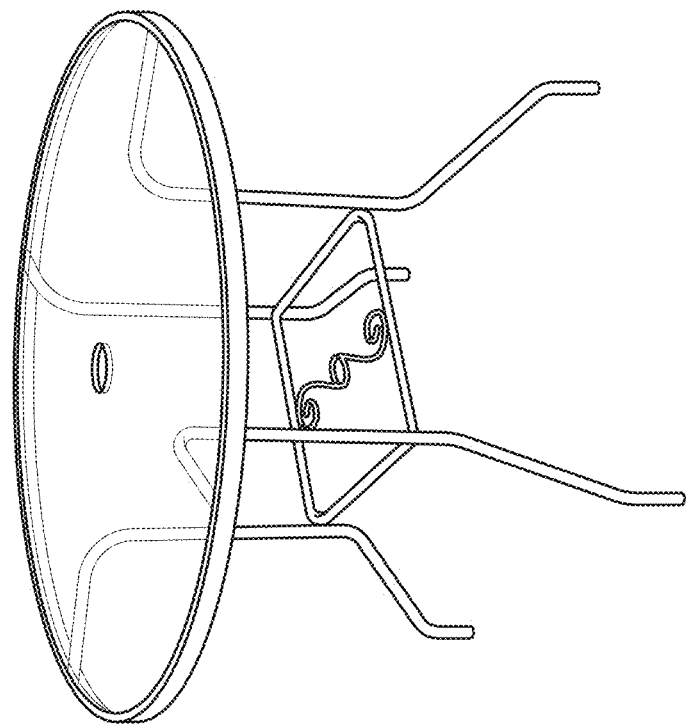
FIGS. 6A and 6B illustrate exemplary user design input of a chair and table in accordance with one or more embodiments of the invention. In this example, assume the user provides input of the two designs shown in FIGS. 6A and 6B.
Figure 6A:
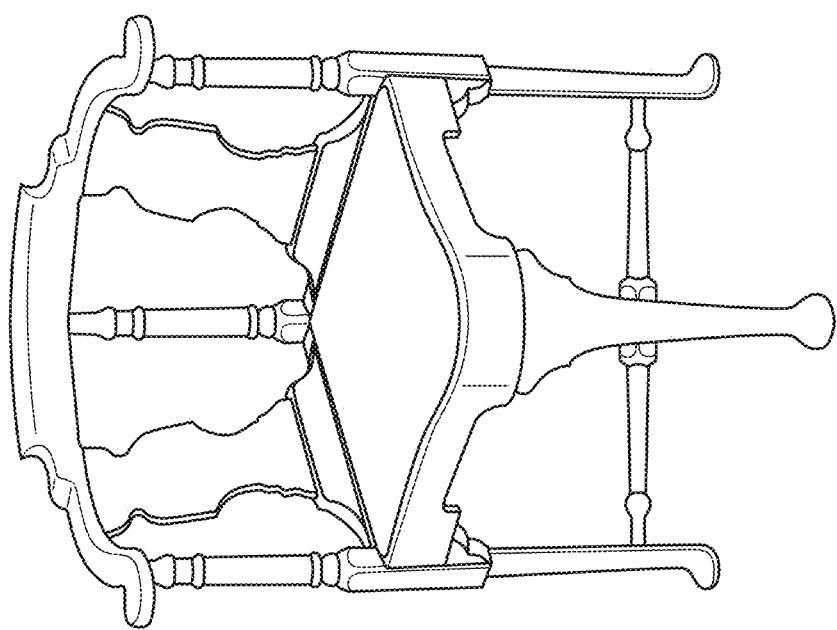

In this example, assume the user provides input of the two designs shown in FIGS. 6A and 6B (i.e., a chair and table). Embodiments of the invention analyze both of the designs and propose a converged design (e.g., such as that illustrated in FIG. 1).

The analysis will use various elements and metadata of the design including, but not limited to, the examples mentioned below.

The design in FIG. 6A is dissected into the following features:

Size of seat: Width, length, area etc. (Importance Rating: 2—major);

Height of the seat (Importance Rating: 2—major);

Load capacity of Seat: 100 kg (Importance Rating: 1—critical);

Base of the chair: support (leg) under each corner of the seat for balancing (Importance Rating: 1—critical); and Size of back rest (Importance Rating: 3—minor).

The design in FIG. 6B is dissected into the following features:

Size of top (Importance Rating: 2—major);
Height of the top (Importance Rating: 2—major);
Load capacity of Seat: 50 kg (Importance Rating: 1—critical); and
Base of the table: 4 legs (Importance Rating: 3—minor).

Embodiments of the invention compare features of both the designs with each other as well as with other designs in a repository and will propose a new design, something similar to the design illustrated in FIG. 1.

The features that can be compared in this case are—
Size of chair seat vs Size of the table top;
Height of the chair seat vs height of the table top;
Base of chair seat vs base of table top; and
Fitment of the size, area, base (etc.) of seat and table with each other for convergence.

The aesthetics of the design (color, shape etc.) have been ignored in this example in order to simplify the example.

Note that this is just an example. The list of features can be extended significantly. Further, the same method may be applied to more than one design.

The new design is proposed to the user, the user makes more amendments in the design, and the same process is followed again until a satisfactory design is finalized. Thus, embodiments of the invention provide a smart design assistant that specifically helps converge different designs.

Dissection and Assembly of Designs

Figure 7:
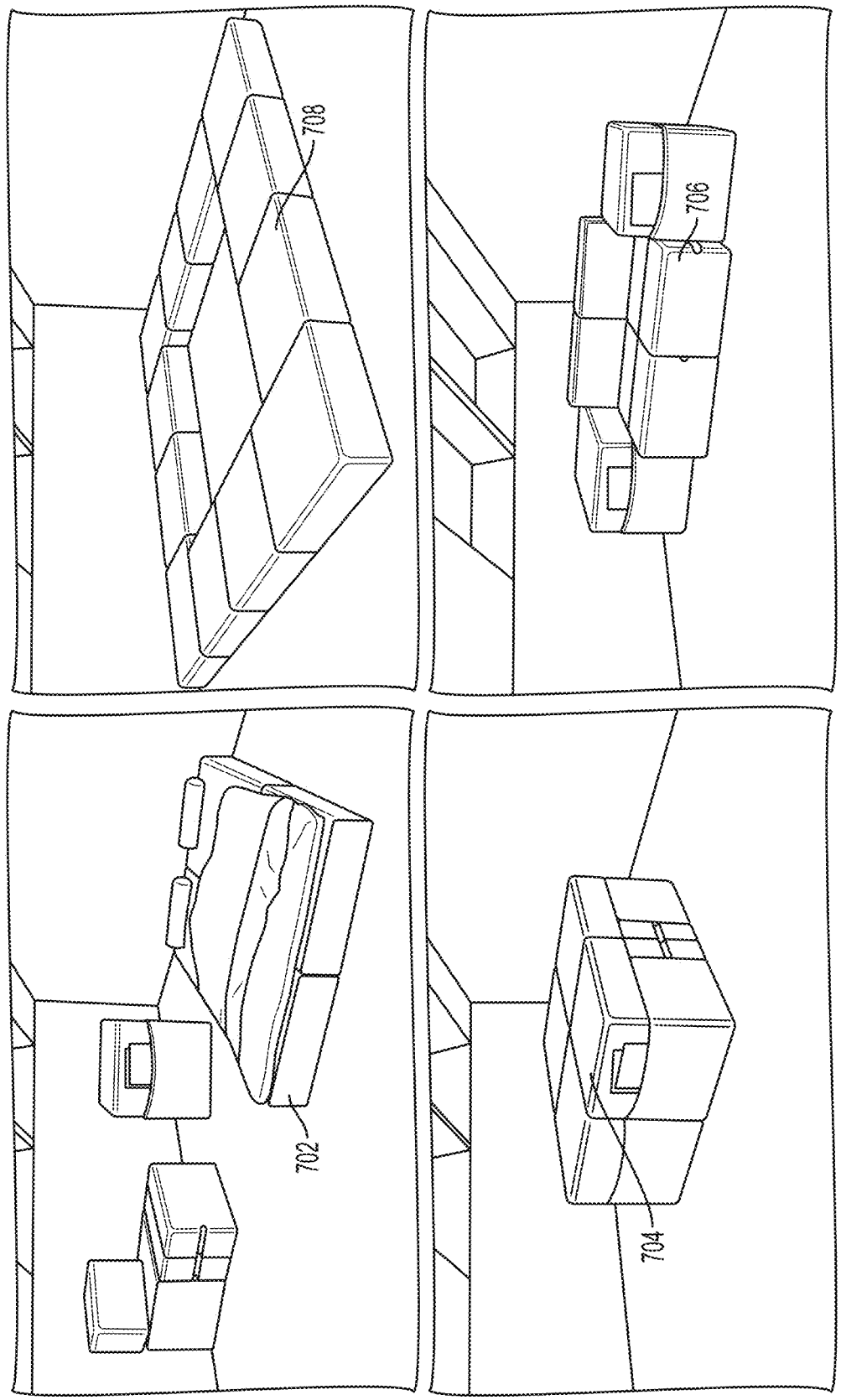
FIG. 7 illustrates an exemplary user design input of a bed, table, sofa, and sitting place in accordance with one or more embodiments of the invention.

In the example showcased in FIG. 7, one may assume that the user submits designs of a bed 702, a table 704, a sofa 706 and a sitting place 708. Embodiments of the invention dissect each design 702-708 and converts the designs into sets of blocks that can come together and allow the user to form all the intended furniture items.

The dissection method would be similar to the Fitment of Designs Example described above, however, rather than converging design based on fitment, embodiments of the invention may enable the 3D printing of various parts that can be organized like LEGO-blocks to build the intended item.

Alternative Embodiments

Clustering of Similar Designs

One or more embodiments of the invention enables the use of the transformability when performing searches for designs. For example, one or more products (e.g., DESIGN GRAPH™) may provide a design search engine that clusters similar designs in the background, and on performing a search, all relevant designs may be provided as a result. Such relevance maybe defined based on the similarity of designs. Embodiments of the invention provide a new dimension to the "relevance" factor by allowing the clustering of designs based on the designs' transformability into each other.

For example, in prior art systems, a search of a design "chair" may return all similar chairs. Embodiments of the invention provide that the same search for a design "chair" will return objects like a table, cupboard, bed, etc. if the chair can be transformed into these objects.

Such capabilities may be enabled via the matchBlocks method that returns a matchCoeff value that can be used to establish the "relevance."

Deep Learning

Embodiments of the invention may be used to prepare a training dataset that can be fed to a deep learning system (e.g., a machine learning module) that can then be used to build models and identify possible transformable designs.

Manufacturing Space

While embodiments of the invention are applicable to design construction, media and manufacturing, alternative embodiments may be utilized in manufacturing space. For example, a user of a cloud-based 3D computer-aided design/computer aided manufacturing (CAD/CAM) tool (e.g., FUSION 360™ offered by the assignee of the present invention) may receive recommendations based on the transformability of the design into other designs available in a customer's design library. Such capabilities significantly improve the production plan for manufacturers where a product, which was planned to be manufactured as a stand-alone product, will be considered for being manufactured as a transformable product. This adds tremendous value to a manufacturer's product line.

AEC Space

Embodiments of the invention may also be utilized in the architecture, engineering, and construction (AEC) space. Flexible construction methods may be used where a building can be constructed using parts that can be assembled/disassembled based on various requirements. For example, for a soccer stadium (e.g., that was built but may no longer be used), the disassembled parts of a stadium may be used "wherever possible." Accordingly, embodiments of the invention may help designers proactively design the stadium such that it is ready to be assembled into different target designs after disassembly.

Iterative Accuracy Improvement

One may note that as described above, the logic and/or methods used to determine matches may evolve (via iterations) over time. For example, embodiments of the invention may start with a simple geometry (e.g., a box structure) but over iterations, more complex structures may be covered (e.g., arc/curve based structures). Further, through iterations, the accuracy for determining the match-coefficient will increase (e.g., as more complex parts are iterated over). In other words, the accuracy of a design match (and hence transformation) may be lower for complex designs but will keep improving as representations for more complex designs are implemented/iterated. Accordingly, the accuracy of results will continuously improve as designs are iterated.

In view of the above, embodiments of the invention may also be applied to a large design library that can then be utilized to build a training dataset to build learning models for transformations.

Hardware Environment

Figure 8:
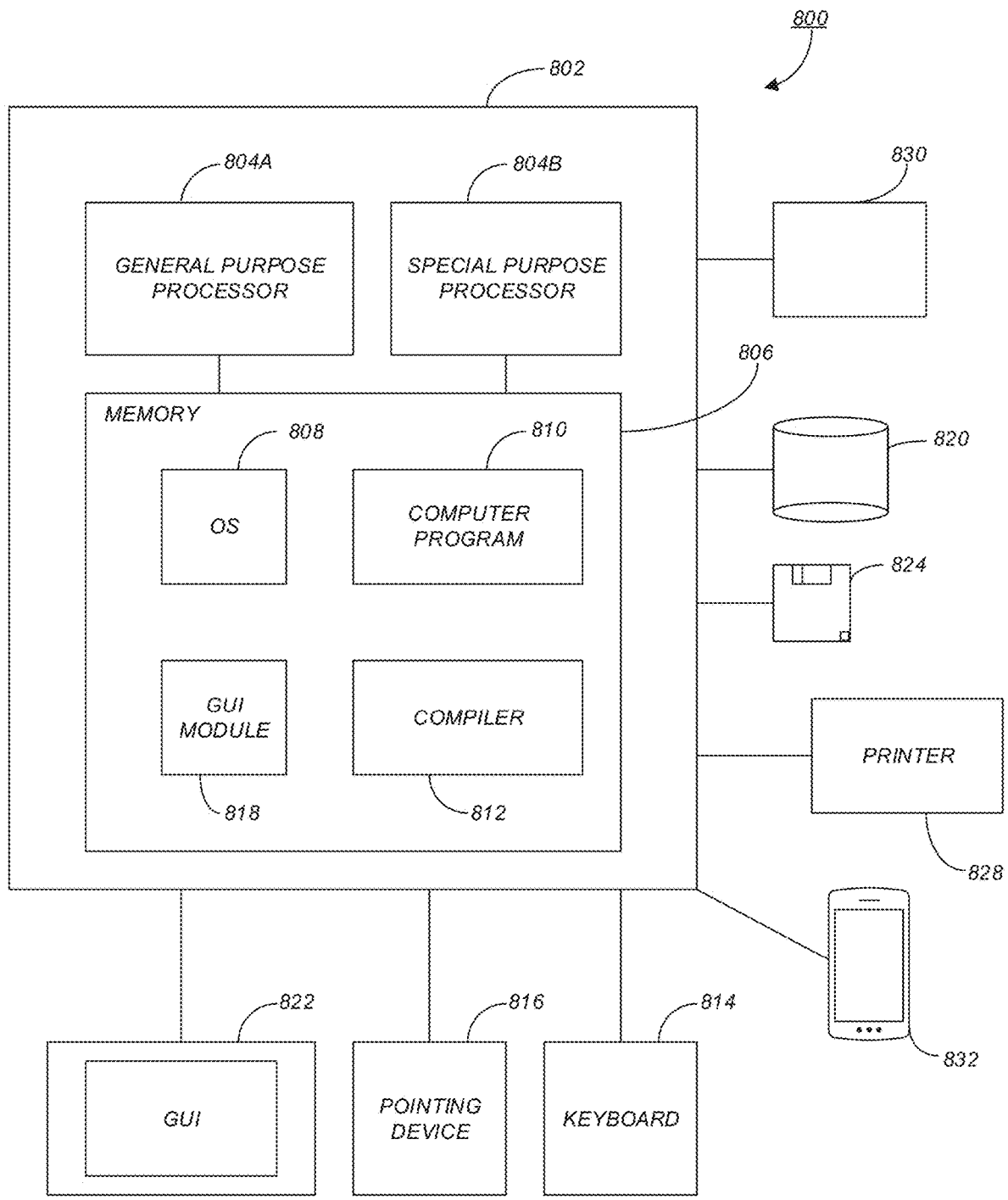
FIG. 8 is an exemplary hardware and software environment used to implement one or more embodiments of the invention.

FIG. 8 is an exemplary hardware and software environment 800 used to implement one or more embodiments of the invention. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
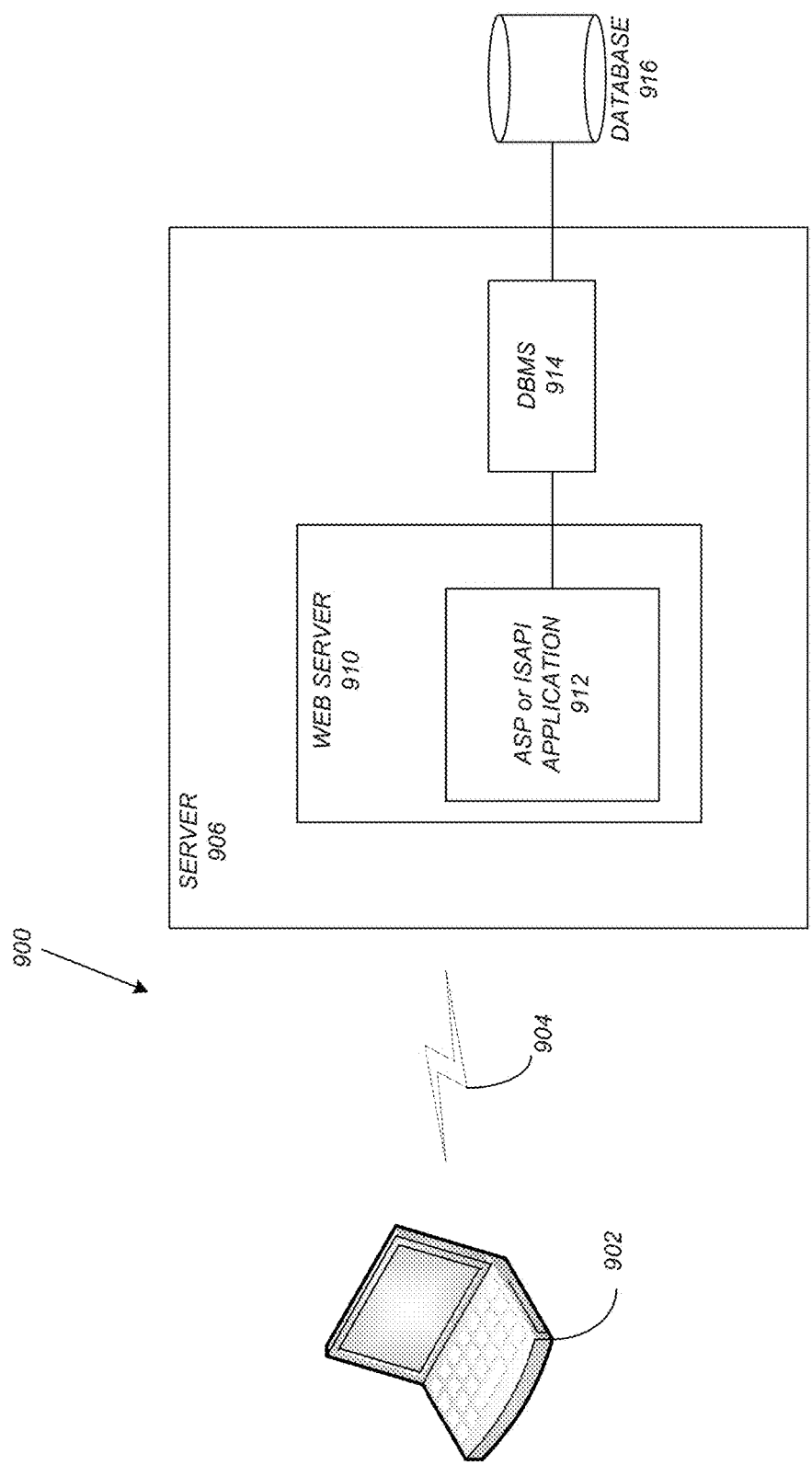
FIG. 9 schematically illustrates a typical distributed/cloud-based computer system using a network to connect client computers to server computers in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to design products that can converge/transform into multiple different products. Such capabilities can be used in multiple industries including, but not limited to manufacturing (e.g., furniture, toys [imagine kids designing and making their own LEGO blocks that can be used to build various structures], auto components, etc.) and construction. For construction, construction companies may operate more like manufacturers by pre-fabricating and assembling things such as apartment units, exterior walls, and ductwork. Accordingly, embodiments of the invention provide a design and make process for construction parts that can be used to create units of different choices and different sizes. Further, embodiments of the invention enable bulk manufacturing of housing components where those components can support various architecture and designs of houses and yet can be dissected in a way that bulk-manufacturing is possible. Further to the above, embodiments of the invention may be utilized in 3D printing such as additive manufacturing.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for generating a transformable structure, comprising:
    (a) receiving, in a computer, design inputs, wherein the design inputs comprise:
        (1) a first design;
        (2) a second design; and
        (3) one or more functional inputs for the first design and/or the second design, wherein the one or more functional inputs relate to visual elements of the first design and/or the second design;
    (b) analyzing, in the computer, different facets of the first design;
    (c) dissecting, in the computer, the first design into multiple blocks that can be assembled to create the first design, wherein each of the multiple blocks comprises a three-dimensional (3D) block having a surface and a volume; and
    (d) converging, via the computer, a new design by analyzing the dissected first design and the functional inputs, wherein the new design represents a converged design comprising converged elements that include the multiple blocks and wherein the first design is transformable into the second design and the second design is transformable into the first design using the multiple blocks and complies with the one or more functional inputs; and
    (e) presenting, via the computer, converged elements of the new design, wherein converged elements of the first design and the second design are displayed, and wherein the presenting is utilized as part of an iterative design process, wherein a final design comprises the converged elements of the new design which is accepted by a user as presented by the computer.

2. The computer-implemented method of claim 1, wherein the design inputs further comprise non-functional inputs for the first design and/or the second design, wherein the non-functional inputs relate to non-visual elements of the first design and/or the second design.

3. The computer-implemented method of claim 1, further comprising:
 (e) accepting amendments to the new design; and
 (f) reconsidering the amended new design by repeating steps (d) and (e) until a final design is acquired.

4. The computer-implemented method of claim 3, further comprising:
 (g) tracking the amendments; and
 (h) adaptively improving the converging based on the tracked amendments.

5. The computer-implemented method of claim 1, further comprising:
 outputting the multiple blocks to a 3D printer for additive printing.

6. The computer-implemented method of claim 5, further comprising:
 collecting feedback about printing each of the multiple blocks; and
 adaptively improving the converging based on the feedback about printing.

7. The computer-implemented method of claim 1, wherein the analyzing dissecting, and converging comprises:
 identifying different possible sets of the multiple blocks that can constitute the first design;
 matching each possible set of the multiple blocks with the second design and returning a match coefficient that indicates how well each possible set of the multiple blocks matches with the second design;
 checking a feasibility of convergence for each possible set of the multiple blocks based on a comparison between the match coefficient and a threshold value.

8. The computer-implemented method of claim 7, further comprising:
 for each possible set of the multiple blocks, generating a convergence set comprising common blocks between the first design and the second design, unique blocks for the first design, and unique blocks for the second design; and
 presenting the convergence set in a graphical user interface, wherein:
  the graphical user interface highlights the common blocks, the unique blocks for the first design, and the unique blocks for the second design;
  the graphical user interface accepts modifications to the first design and/or the second design to reduce a number of the unique blocks for the first design and/or the unique blocks for the second design.

9. The computer-implemented method of claim 7, wherein:
 the match coefficient is based on a difference in values of the one or more functional inputs.

10. A computer system for generating a transformable structure comprising:
 (a) a computer having a memory;
 (b) an application executing on the computer, wherein the application:
  (1) receives design inputs, wherein the design inputs comprise:
   (i) a first design;
   (ii) a second design; and
   (iii) one or more functional inputs for the first design and/or the second design, wherein the one or more functional inputs relate to visual elements of the first design and/or the second design;
  (2) analyzes different facets of the first design;
  (3) dissects the first design into multiple blocks that can be assembled to create the first design, wherein each of the multiple blocks comprises a three-dimensional (3D) block having a surface and a volume;
  (4) converges a new design by analyzing the dissected first design and the functional inputs, wherein the new design represents a converged design comprising converged elements that include the multiple blocks and wherein the first design is transformable into the second design and the second design is transformable into the first design using the multiple blocks and complies with the one or more functional inputs; and
  (5) presents converged elements of the new design, wherein converged elements of the first design and the second design are displayed, and wherein the application presents the converged elements as part of an iterative design process, wherein a final design comprises the converged elements of the new design which is accepted by a user as presented by the computer.

11. The computer system of claim 10, wherein the design inputs further comprise non-functional inputs for the first design and/or the second design, wherein the non-functional inputs relate to non-visual elements of the first design and/or the second design.

12. The computer system of claim 10, wherein the application further:
 (5) accepts amendments to the new design; and
 (6) reconsiders the amended new design by repeating steps (4) and (5) until a final design is acquired.

13. The computer system of claim 12, wherein the application further:
 (7) tracks the amendments; and
 (8) adaptively improves the converging based on the tracked amendments.

14. The computer system of claim 10, wherein the application further:
 outputs the multiple blocks to a 3D printer for additive printing.

15. The computer system of claim 14, wherein the application further:
 collects feedback about printing each of the multiple blocks; and
 adaptively improves the converging based on the feedback about printing.

16. The computer system of claim 10, wherein the application analyzes dissects, and converges by:
 identifying different possible sets of the multiple blocks that can constitute the first design;
 matching each possible set of the multiple blocks with the second design and returning a match coefficient that indicates how well each possible set of the multiple blocks matches with the second design;
 checking a feasibility of convergence for each possible set of the multiple blocks based on a comparison between the match coefficient and a threshold value.

17. The computer system of claim 16, wherein the application further:
 for each possible set of the multiple blocks, generates a convergence set comprising common blocks between the first design and the second design, unique blocks for the first design, and unique blocks for the second design; and presents the convergence set in a graphical user interface, wherein:
  the graphical user interface highlights the common blocks, the unique blocks for the first design, and the unique blocks for the second design;
  the graphical user interface accepts modifications to the first design and/or the second design to reduce a number of the unique blocks for the first design and/or the unique blocks for the second design.

18. The computer system of claim 16, wherein:
the match coefficient is based on a difference in values of the one or more functional inputs.

\* \* \* \* \*